(12) United States Patent
Lee et al.

(10) Patent No.: US 10,317,693 B2
(45) Date of Patent: Jun. 11, 2019

(54) DIRECTIONAL BACKLIGHT UNIT AND THREE-DIMENSIONAL IMAGE DISPLAY APPARATUS INCLUDING THE SAME

(71) Applicant: SAMSUNG ELECTRONICS CO., LTD., Suwon-si (KR)

(72) Inventors: Sunghoon Lee, Seoul (KR); Joonyong Park, Suwon-si (KR); Bongsu Shin, Seoul (KR); Dongouk Kim, Pyeongtaek-si (KR); Jihyun Bae, Seoul (KR); Dongsik Shim, Hwaseong-si (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/434,364

(22) Filed: Feb. 16, 2017

(65) Prior Publication Data

US 2018/0081190 A1 Mar. 22, 2018

(30) Foreign Application Priority Data

Sep. 22, 2016 (KR) .................. 10-2016-0121461

(51) Int. Cl.
G02B 27/26 (2006.01)
G02B 5/18 (2006.01)
G02B 5/30 (2006.01)
F21V 8/00 (2006.01)
(Continued)

(52) U.S. Cl.
CPC ........... *G02B 27/26* (2013.01); *G02B 5/1819* (2013.01); *G02B 5/3058* (2013.01); *G02B 6/005* (2013.01);
(Continued)

(58) Field of Classification Search
CPC ........... G02F 1/133536; G02F 1/13362; G02F 2001/133545; G02F 2001/133607;
(Continued)

(56) References Cited

U.S. PATENT DOCUMENTS

| 6,285,423 B1* | 9/2001 | Li ........................ G02B 6/0025 349/117 |
| 7,614,757 B2* | 11/2009 | Nesterenko ......... G02F 1/13362 359/485.05 |

(Continued)

FOREIGN PATENT DOCUMENTS

| CN | 103235415 A | 8/2013 |
| JP | 2005-259686 A | 9/2005 |
| KR | 10-2007-0027980 A | 3/2007 |

OTHER PUBLICATIONS

Communication dated Feb. 21, 2018 issued by the European Patent Office in counterpart European Patent Application No. 17184394.9.

*Primary Examiner* — Huyen L Ngo
(74) *Attorney, Agent, or Firm* — Sughrue Mion, PLLC

(57) ABSTRACT

A directional backlight unit includes: a light source configured to emit light; a light guide plate including: an incident surface on which light emitted by the light source is incident, an emission surface from which the light incident on the incident surface is emitted, and a reflective surface facing the emission surface; a reflective polarizer provided on the emission surface and configured to transmit a portion of the light as first polarized light having a first polarization direction and reflect another portion of the light as second polarized light having a second polarization direction and being perpendicular to the first polarized light; and a diffractor configured to diffract the first polarized light transmitted through the reflective polarizer toward a plurality of viewing zones.

19 Claims, 10 Drawing Sheets

(51) Int. Cl.
  *G02F 1/1335* (2006.01)
  *G02B 27/22* (2018.01)
  *H04N 13/31* (2018.01)

(52) U.S. Cl.
  CPC ......... *G02B 6/0056* (2013.01); *G02B 6/0065* (2013.01); *G02B 27/225* (2013.01); *G02F 1/133528* (2013.01); *H04N 13/31* (2018.05); *G02B 5/1842* (2013.01); *G02F 1/133615* (2013.01); *G02F 2001/133548* (2013.01); *H04N 2213/001* (2013.01)

(58) Field of Classification Search
  CPC ......... G02F 1/133528; G02F 1/133615; G02F 2001/133548; B29C 55/023; B29K 2995/003; B29K 2995/0034; G02B 5/3025; G02B 27/26; G02B 27/225; G02B 6/0065; G02B 6/0056; G02B 5/1819; G02B 5/3058; G02B 6/005; G02B 5/1842; H04N 13/31; H04N 2213/001
  See application file for complete search history.

(56) References Cited

U.S. PATENT DOCUMENTS

| | | | |
|---|---|---|---|
| 2003/0231497 A1* | 12/2003 | Sakata | H04N 5/74 362/341 |
| 2008/0118660 A1* | 5/2008 | Choi | G02B 5/3058 427/532 |
| 2011/0244187 A1* | 10/2011 | Rinko | B29D 11/0073 428/156 |
| 2012/0280953 A1 | 11/2012 | Cheng et al. | |
| 2013/0271674 A1* | 10/2013 | Liu | G02F 1/133621 349/12 |
| 2013/0308185 A1 | 11/2013 | Robinson et al. | |
| 2014/0300840 A1 | 10/2014 | Fattal et al. | |
| 2014/0300947 A1 | 10/2014 | Fattal et al. | |
| 2014/0300960 A1 | 10/2014 | Santori et al. | |
| 2015/0036068 A1 | 2/2015 | Fattal et al. | |
| 2015/0268479 A1 | 9/2015 | Woodgate et al. | |
| 2016/0033818 A1* | 2/2016 | Lee | G02F 1/133528 349/96 |
| 2016/0091752 A1* | 3/2016 | Lien | G02F 1/133504 349/68 |

* cited by examiner

DIRECTIONAL BACKLIGHT UNIT AND THREE-DIMENSIONAL IMAGE DISPLAY APPARATUS INCLUDING THE SAME

CROSS-REFERENCE TO RELATED APPLICATION

This application claims priority from Korean Patent Application No. 10-2016-0121461, filed on Sep. 22, 2016 in the Korean Intellectual Property Office, the disclosure of which is incorporated herein in its entirety by reference.

BACKGROUND

1. Field

Methods and apparatuses consistent with exemplary embodiments disclosed herein relate to three-dimensional (3D) image display apparatuses for displaying 3D images by using a diffraction effect.

2. Description of the Related Art

Currently, a large number of three-dimensional (3D) movies are being released and thus research is being actively conducted on technologies related to 3D image display apparatuses. A 3D image display apparatus displays a 3D image based on binocular parallax. Currently commercialized 3D image display apparatuses use binocular parallax between two eyes and provide a 3D effect to viewers by providing left-view and right-view images to left and right eyes of the viewers, respectively. The 3D image display apparatuses include stereoscopic 3D image display apparatuses which require a viewer to wear special glasses, and autostereoscopic 3D image display apparatuses which do not require the use of any glasses.

Autostereoscopic 3D display schemes are categorized into a multiview 3D display, a volumetric 3D display, an integral imaging display, and a hologram display, and research is currently being actively conducted on multiview 3D displays. A multiview 3D display scheme generates multiple views in a view space by sending different pieces of image information in a plurality of directions. Representative examples thereof include parallax barrier, lenticular lens, projection, and directional backlight schemes.

The multiview 3D display scheme based on a directional backlight exhibits lower crosstalk compared to the other schemes, but optical efficiency thereof should be improved and crosstalk thereof should be further reduced.

SUMMARY

Exemplary embodiments provide 3D image display apparatuses for displaying 3D images by using a diffraction effect to reduce crosstalk.

According to an aspect of an exemplary embodiment, there is provided a directional backlight unit including: a light source configured to emit light; a light guide plate including: an incident surface on which light emitted by the light source is incident, an emission surface from which the light incident on the incident surface is emitted, and a reflective surface facing the emission surface; a reflective polarizer provided on the emission surface and configured to transmit a portion of the light as first polarized light having a first polarization direction and reflect another portion of the light as second polarized light having a second polarization direction and being perpendicular to the first polarized light; and a diffractor configured to diffract the first polarized light transmitted through the reflective polarizer toward a plurality of viewing zones.

The reflective polarizer may be a wire grid polarizer which includes a plurality of metal wires arranged repeatedly along the first polarization direction, the metal wires made of a reflective metal and having a length direction parallel to the second polarization direction.

The plurality of metal wires may be integrally provided on the emission surface of the light guide plate.

The wire grid polarizer may further include a transparent substrate on which the plurality of metal wires are provided.

The transparent substrate may be made of a material having a same refractive index as a refractive index of the light guide plate.

The directional backlight unit may further include a planarization layer provided to cover spaces between and on the plurality of metal wires.

The planarization layer may be made of a material having a same refractive index as a refractive index of the light guide plate.

The directional backlight unit may further include a polarization changing member provided on the reflective surface.

The directional backlight unit may further include a polarization changing member provided on a surface of the light guide plate facing the incident surface.

The diffractor may include a plurality of diffractor units, wherein each of the plurality of diffractor units may include a plurality of sections corresponding to a number of the plurality of viewing zones, wherein each of the plurality of sections may include a grating unit provided to control an emission direction of light, and wherein each of the grating units may include a plurality of sub-grating units.

Each of the sub-grating units may include gratings, and one of an arrangement direction or an arrangement interval of the gratings included in one of the plurality of sub-grating units may differ from an arrangement direction or an arrangement interval of the gratings included in another of the plurality of sub-grating units.

According to an aspect of another exemplary embodiment, there is provided a method of manufacturing a directional backlight unit, the method including: forming a wire grid polarizer on a light guide plate; and forming a diffractor including a plurality of diffraction regions on the wire grid polarizer, wherein one of an arrangement interval or an arrangement direction of one of the plurality of diffraction regions differs from an arrangement interval or an arrangement direction of another of the plurality of diffraction regions.

The forming of the wire grid polarizer may include: forming a reflective metal layer on the light guide plate; and forming a pattern of a plurality of metal wires by etching the reflective metal layer.

The method may further include forming a planarization layer to cover spaces between and on the plurality of metal wires.

The planarization layer may be made of a material having a same refractive index as a refractive index of the light guide plate.

According to an aspect of another exemplary embodiment, there is provided a 3D image display apparatus including: a directional backlight unit including: a light source configured to emit light; a light guide plate including: an incident surface on which light emitted by the light source is incident, an emission surface from which the light incident on the incident surface is emitted, and a reflective surface facing the emission surface; a reflective polarizer provided on the emission surface and configured to transmit a portion of the light as first polarized light having a first polarization direction and reflect another portion of the light as second polarized light having a second polarization direction and being perpendicular to the first polarized light; and a diffractor configured to diffract the first polarized light transmitted through the reflective polarizer toward a plurality of viewing zones; and a display panel provided to modulate the diffracted light radiated from the directional backlight unit, based on image information.

The display panel may be a liquid crystal panel.

The liquid crystal panel may include only one polarizing plate.

The liquid crystal panel may include a display surface; and the polarizing plate may be located on the display surface of the liquid crystal panel.

The polarizing plate may be an absorption-type polarizing plate configured to transmit a portion of the light having one of a first polarization direction and a second polarization direction, and absorb another portion of the light having the other of the first polarization direction and the second polarization direction.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
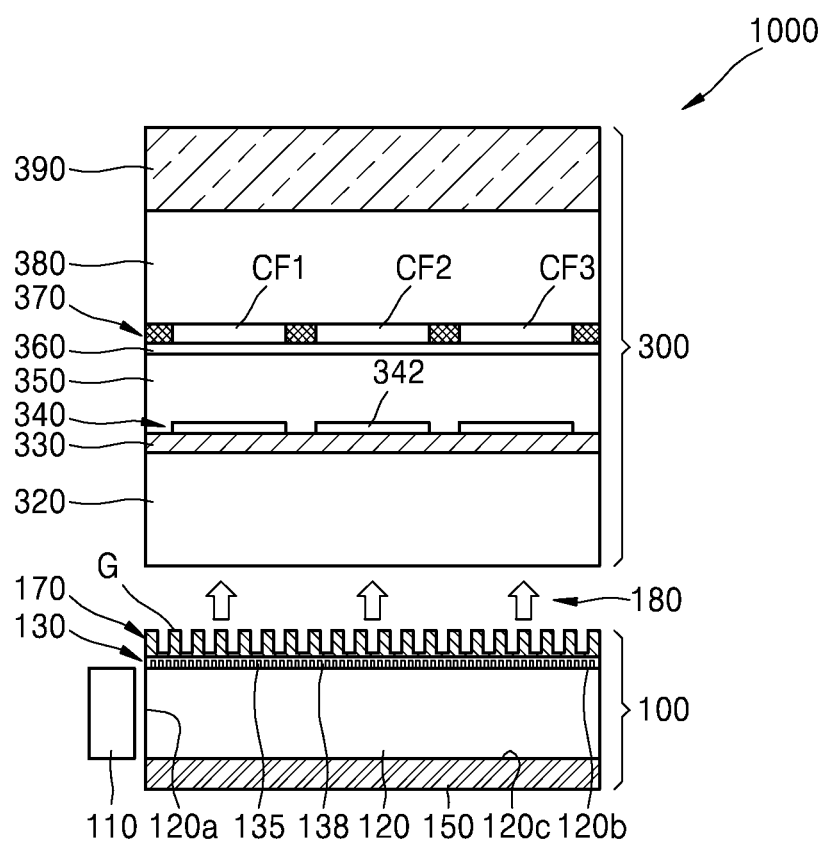
FIG. 1 is a cross-sectional view showing structures of a directional backlight unit and a 3D image display apparatus employing the same, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects thereof. Expressions such as "at least one of," when preceding a list of elements, modify the entire list of elements and do not modify the individual elements of the list.

It will be understood that when a layer is referred to as being "on" another layer or substrate, the layer can be directly on the other layer or substrate, or intervening layers may also be present.

It will also be understood that, although the terms first, second, etc. may be used herein to describe various elements, these elements should not be limited by these terms. These terms are only used to distinguish one element from another.

As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

In the following description, the term "unit" or "module" is used to describe an element for performing at least one function or operation, and may be implemented as hardware, software, or a combination thereof.

FIG. 1 is a cross-sectional view showing structures of a directional backlight unit 100 and a 3D image display apparatus 1000 employing the same, according to an exemplary embodiment.

The 3D image display apparatus 1000 includes the directional backlight unit 100 for providing directional light, and a display panel 300 for modulating the light provided from the directional backlight unit 100, based on image information.

The directional backlight unit 100 provides polarized directional light 180 to the display panel 300. The directional backlight unit 100 includes a light source 110, a light guide plate 120 for guiding light incident from the light source 110 to be emitted from an emission surface, a reflective polarizer 130 located on the light guide plate 120, and a diffractor 170 located on the reflective polarizer 130.

The light source 110 may be provided on at least one side of the light guide plate 120. The light source 110 may radiate (emit) light of at least one wavelength band. For example, the light source 110 may include a light emitting diode (LED) or a laser diode (LD). However, the light source 110 is not limited thereto and any light source capable of radiating light of a plurality of wavelengths may be used.

The light source 110 may include a plurality of LEDs or LDs arranged along at least one direction of the light guide plate 120. The light source 110 may include, for example, a first light source for irradiating light of a first wavelength band, a second light source for irradiating light of a second wavelength band, and a third light source for irradiating light of a third wavelength band, and the first light source, the second light source, and the third light source may be provided in plural numbers. The first light sources, the second light sources, and the third light sources may be provided to radiate light to be incident on an incident surface 120a at different angles.

The light guide plate 120 is made of a transparent material, e.g., glass or transparent plastic, and guides light incident from the light source 110 located at a side thereof, inside the light guide plate 120 due to total reflection, to be emitted from an emission surface 120b located thereon. The light guide plate 120 includes the incident surface 120a on which light is incident, the emission surface 120b from which the light incident on the incident surface 120a is emitted, and a reflective surface 120c facing the emission surface 120b.

The reflective polarizer 130 is located on the emission surface 120b of the light guide plate 120, transmits first polarized light, e.g., P-polarized light, and reflects second polarized light perpendicular to the first polarized light, e.g., S-polarized light. The reflective polarizer 130 may be a wire grid polarizer.

Figure 2:
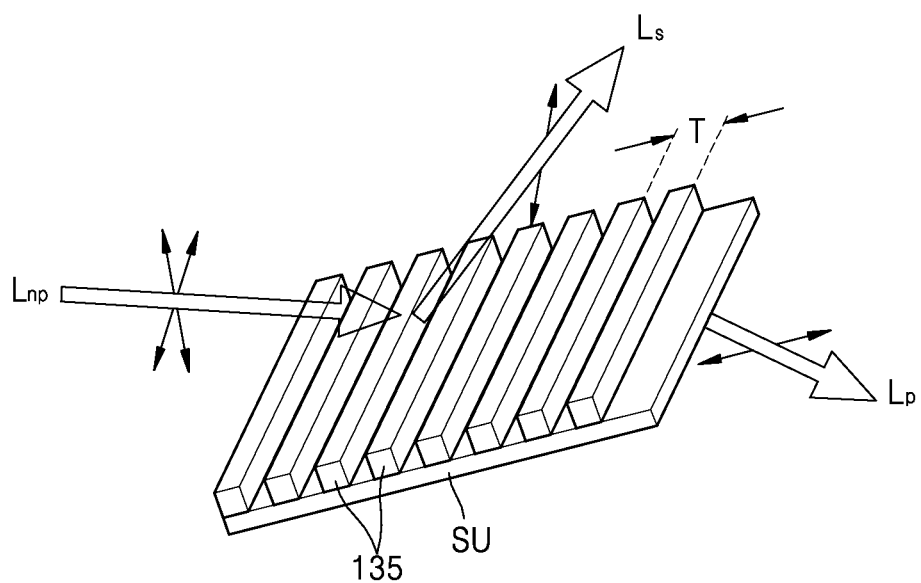
FIG. 2 is a perspective view for describing a structure and function of a reflective polarizer included in the directional backlight unit of the 3D image display apparatus of FIG. 1.

Referring to FIG. 2, the reflective polarizer 130 includes a plurality of metal wires 135 made of a reflective metal, and the metal wires 135 may be repeatedly arranged in a direction on a transparent substrate SU. According to certain exemplary embodiments, the transparent substrate SU may be omitted. For example, the metal wires 135 may be integrated with the emission surface 120b of the light guide plate 120 as illustrated in FIG. 1. Alternatively, the transparent substrate SU having the metal wires 135 arranged thereon may be provided on the emission surface 120b of the light guide plate 120. In this case, the transparent substrate SU may be made of a material having the same refractive index as that of the light guide plate 120, although is not limited thereto. The transparent substrate SU may be made of the same material as that of the light guide plate 120, but is not limited thereto.

The metal wires 135 may be made of a metal such as aluminum (Al), silver (Ag), magnesium (Mg), platinum (Pt), palladium (Pd), gold (Au), nickel (Ni), neodymium (Nd), iridium (Ir), or chromium (Cr). Since the metal has light-reflecting properties, the metal wires 135 may diffract or reflect light based on an arrangement interval T thereof. If the arrangement interval T of the metal wires 135 is greater than the wavelength of incident light, characteristics of a diffraction grating are achieved. If the arrangement interval T is less than the wavelength of incident light, characteristics of a polarizer are achieved. Accordingly, the metal wires 135 may serve as a polarizer by configuring the arrangement interval T of the metal wires 135 to be less than the wavelength of a visible light band. The arrangement interval T of the metal wires 135 may be equal to or less than several hundred nanometers, and may be about several tens of nanometers. Based on the metal used for the metal wires 135 and the shape and arrangement of the metal wires 135, among the non-polarized light $L_{np}$ incident on the reflective polarizer 130, second polarized light $L_s$ corresponding to a length direction of the metal wires 135 may be reflected, and first polarized light $L_p$ corresponding to a first direction perpendicular to the length direction may be transmitted.

As illustrated in FIG. 1, a planarization layer 138 may be further provided to cover spaces between and on the metal wires 135. The planarization layer 138 may be made of a material having the same refractive index as that of the light guide plate 120, or made of the same material as that of the light guide plate 120. The planarization layer 138 is provided to support the diffractor 170, and may be omitted according to certain exemplary embodiments.

The diffractor 170 diffracts light toward a plurality of viewing zones, includes a plurality of gratings G, and is located on the reflective polarizer 130. Only the first polarized light transmitted through the reflective polarizer 130 is incident on the diffractor 170, and proceeds toward a plurality of viewing zones due to the gratings G included in the diffractor 170. Although FIGS. 1 and 2 illustrate gratings G having the same size, shape, and arrangement intervals, the illustration is provided for the sake of convenience and the diffractor 170 may include a plurality of grating units including gratings G having different shapes, sizes, and/or arrangement intervals. The detailed configuration of the diffractor 170 for diffracting incident light toward a plurality of viewing zones with directivities will be described below with reference to FIGS. 3 to 6.

A polarization changing member 150 may be further provided on a bottom surface of the light guide plate 120, e.g., the reflective surface 120c facing the emission surface 120b. The polarization changing member 150 may be an element including, for example, a quarter-wave plate and a reflective plate. The polarization changing member 150 is provided to change a polarization direction of polarized light not transmitted through the reflective polarizer 130, while the light proceeds in the light guide plate 120. The second polarized light not transmitted through the reflective polarizer 130 may be transformed into the first polarized light by the polarization changing member 150, transmitted through the reflective polarizer 130, and thus, be incident on the diffractor 170 to serve to form a directional beam.

Light provided by the directional backlight unit 100 is provided to the display panel 300 in the form of the polarized directional light 180, e.g., the first polarized light having directivities toward a plurality of viewing zones.

The display panel 300 may be, for example, a liquid crystal panel. The display panel 300 includes a first substrate 320 having a pixel electrode array 340 provided thereabove, a second substrate 380 having a common electrode 360 provided therebelow, and a liquid crystal layer 350 located between the first substrate 320 and the second substrate 380.

Unlike a typical liquid crystal panel, the display panel 300 according to an exemplary embodiment includes only one polarizing plate 390. The polarizing plate 390 is provided on a top surface of the second substrate 380, e.g., a display surface from which light modulated by the liquid crystal layer 350 is emitted, and no polarizing plate is provided on a bottom surface of the first substrate 320, e.g., a surface on which light is incident from the directional backlight unit 100. Although no polarizing plate is provided at the above-described location, light polarized in a certain direction can be provided to the liquid crystal layer 350 by the directional backlight unit 100.

A color filter array 370 for providing colors is provided under the second substrate 380, e.g., between the common electrode 360 and the second substrate 380. The color filter array 370 includes a first color filter CF1, a second color filter CF2, and a third color filter CF3 which may be filters for transmitting red, green, and blue light, respectively.

The pixel electrode array 340 includes a plurality of pixel electrodes 342 facing the first to third color filters CF1 to CF3 of the color filter array 370. A thin film transistor (TFT) array layer 330 including a plurality of transistors for controlling the pixel electrodes 342 is provided on the first substrate 320.

The polarizing plate 390 may be provided on an outer surface of the second substrate 380, and may transmit light having a certain polarization direction within light transmitted through the liquid crystal layer 350 and the color filter array 370. The polarization direction of light transmitted by the polarizing plate 390 may be perpendicular to or the same as the polarization direction of light provided by the directional backlight unit 100. The polarizing plate 390 may be an absorption-type polarizing plate for transmitting light of a polarization direction and absorbing light of another polarization direction. The polarizing plate 390 may be made of, for example, polyvinyl acetate (PVA).

Basic pixels of the liquid crystal layer 350 are determined by individual arrangements of the first to third color filters CF1 to CF3 of the color filter array 370 and the pixel electrodes 342 of the pixel electrode array 340. Each of the basic pixels corresponds to the smallest grating unit of the diffractor 170 included in the directional backlight unit 100.

The configuration of the diffractor 170 will now be described with reference to FIGS. 3 to 6.

Figure 3:
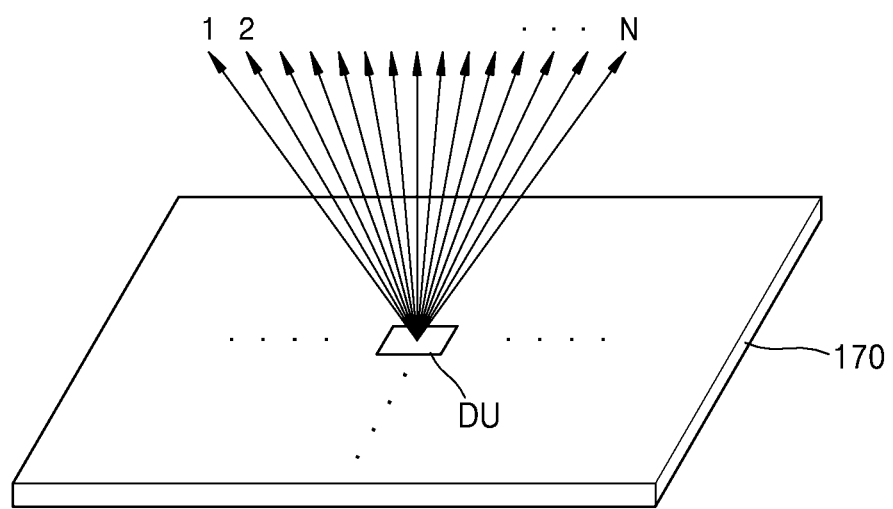
FIG. 3 is a conceptual view for describing how a 3D image is perceived due to a diffractor included in the 3D image display apparatus of FIG. 1.
Figure 4:
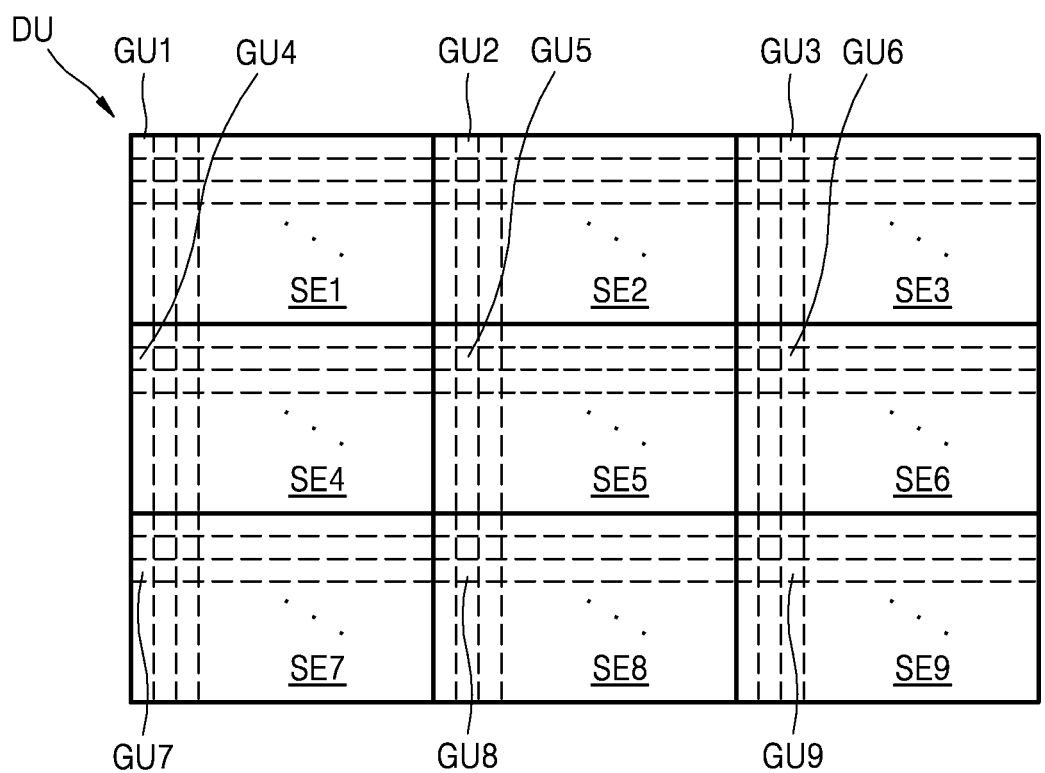
FIG. 4 is a conceptual view showing that a diffractor unit of the diffractor included in the 3D image display apparatus of FIG. 1 includes grating units corresponding to different viewing zones.
Figure 5:
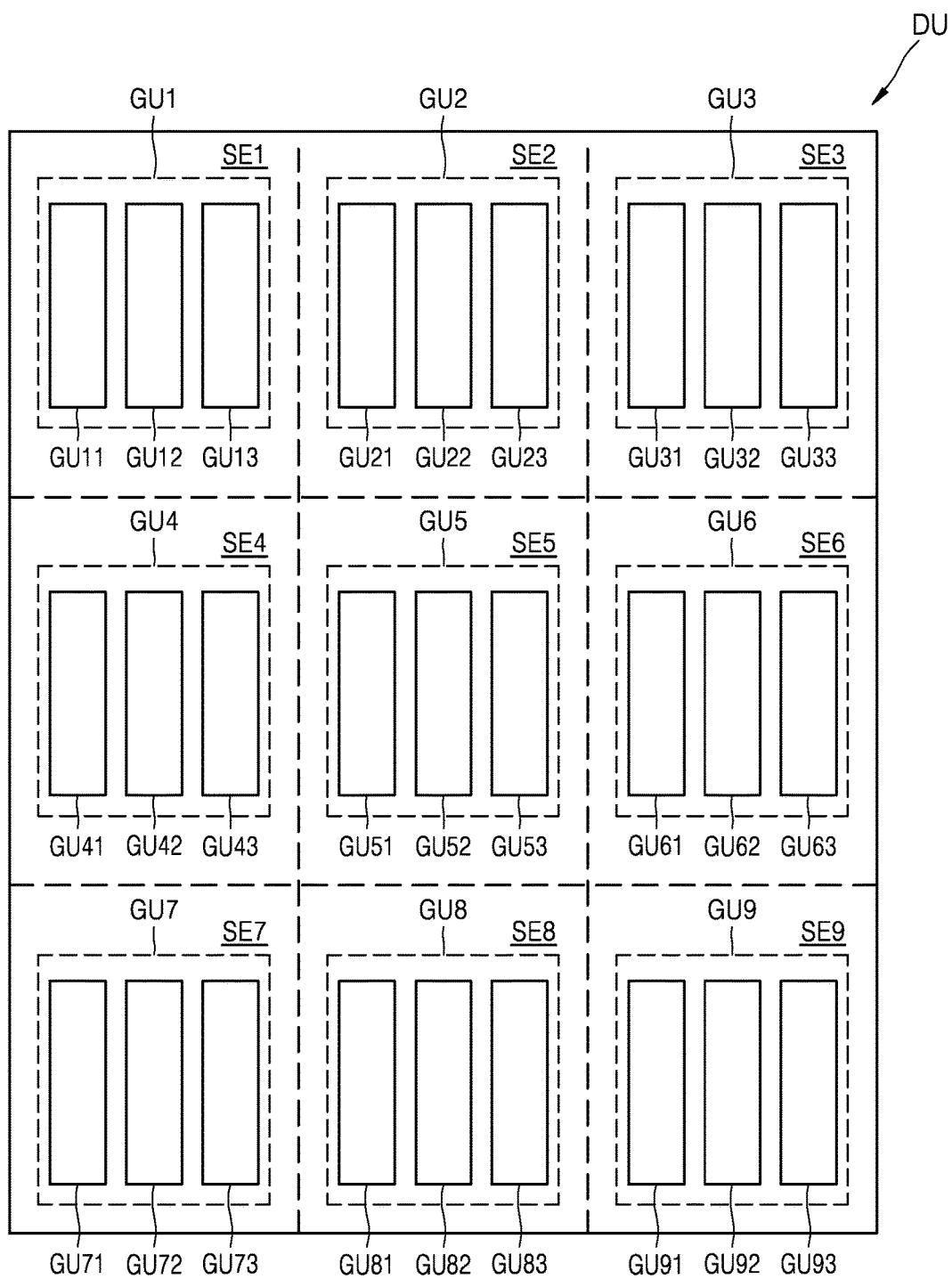
FIG. 5 is a plan view showing that each of the grating units illustrated in FIG. 4 includes a plurality of sub-grating units.
Figure 6:
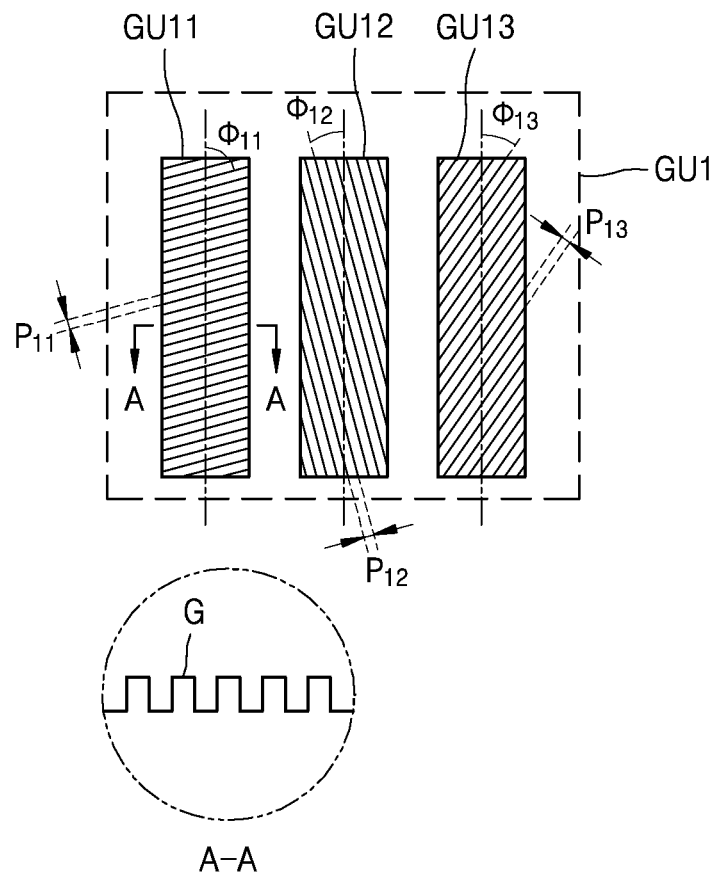
FIG. 6 is a plan view showing a detailed configuration of the sub-grating units illustrated in FIG. 5.

FIG. 3 is a conceptual view for describing how a 3D image is perceived due to the diffractor 170 included in the 3D image display apparatus 1000 of FIG. 1, FIG. 4 is a conceptual view showing that a diffractor unit DU of the diffractor 170 included in the 3D image display apparatus 1000 of FIG. 1 includes grating units corresponding to different viewing zones, FIG. 5 is a plan view showing that each of the grating units illustrated in FIG. 4 includes a plurality of sub-grating units, and FIG. 6 is a plan view showing a detailed configuration of the sub-grating units illustrated in FIG. 5.

Referring to FIG. 3, the diffractor 170 includes a plurality of repeatedly provided diffractor units DU. Each of the diffractor units DU includes grating patterns capable of diffracting light toward a plurality of viewing zones, e.g., includes grating pattern sets corresponding to the number and types of the viewing zones. As illustrated in FIG. 1, light incident from the light source 110, guided by the light guide plate 120, and transmitted through the reflective polarizer 130 is incident on the diffractor unit DU provided on the diffractor 170, and obtains directivities toward different viewing zones due to the grating patterns provided at incident locations thereof. As illustrated in FIG. 3, the light is emitted in directions toward N viewing zones and then is incident on the display panel 300. Although FIG. 3 illustrates one diffractor unit DU, a plurality of diffractor units DU may be repeatedly provided. The light incident on the diffractor 170 obtains directivities toward N different viewing zones due to the grating patterns provided at different locations, and is incident on a pixel region of the display panel 300.

As described above, light emitted in different directions may provide different views in a plurality of viewing zones and thus, may display a 3D image. Herein, a view may indicate, for example, an image provided to an eye of a viewer. However, the view is not limited thereto and images corresponding to two or more views may be provided to an eye of a viewer. The grating pattern sets are determined based on the number of views to be provided. For example, 36 views, 48 views, or 96 views may be provided. Since different views are provided in a plurality of viewing zones as described above, a viewer may perceive a 3D image. As the number of views is increased, a space where a 3D image is perceivable may be widened and the resolution of each view may be relatively lowered.

Referring to FIGS. 4 and 5, to diffract light toward a plurality of viewing zones, the diffractor unit DU includes grating pattern sets corresponding to the number and types of the viewing zones. The diffractor unit DU includes a plurality of sections. The number of sections is the same as the number of viewing zones in FIG. 3, i.e., N. Although FIGS. 4 and 5 illustrate 9 sections (N=9), the illustration merely corresponds to an example and N may be more or less than 9.

Each of the sections includes a grating unit provided to control an emission direction of light transmitted through the reflective polarizer 130. A plurality of sections SE may include different grating pattern sets. Herein, the sections SE may indicate physically distinguished regions. Alternatively, the sections SE may be regions distinguished based on the grating pattern sets.

The diffractor 170 may include, for example, first to ninth sections SE1 to SE9. Herein, the sections may indicate regions corresponding to different grating pattern sets. For example, the diffractor 170 may include 9 sections, 16 sections, or 25 sections. Alternatively, the diffractor 170 may include various numbers of sections based on the number of views to be provided. The grating pattern sets may include a plurality of grating units, and different grating units may be set for the respective sections. The first to ninth sections SE1 to SE9 may include first to ninth grating units GU1 to GU9 designed appropriately for directivities of the first to ninth sections SE1 to SE9, respectively.

FIG. 5 illustrates that each of the first to ninth grating units GU1 to GU9 illustrated in FIG. 4 includes a plurality of sub-grating units.

The first grating unit GU1 includes a first-first sub-grating unit GU11, a first-second sub-grating unit GU12, and a first-third sub-grating unit GU13. The second grating unit GU2 includes a second-first sub-grating unit GU21, a second-second sub-grating unit GU22, and a second-third sub-grating unit GU23. The third grating unit GU3 includes a third-first sub-grating unit GU31, a third-second sub-grating unit GU32, and a third-third sub-grating unit GU33. The fourth grating unit GU4 includes a fourth-first sub-grating unit GU41, a fourth-second sub-grating unit GU42, and a fourth-third sub-grating unit GU43. The fifth grating unit GU5 includes a fifth-first sub-grating unit GU51, a fifth-second sub-grating unit GU52, and a fifth-third sub-grating unit GU53. The sixth grating unit GU6 includes a sixth-first sub-grating unit GU61, a sixth-second sub-grating unit GU62, and a sixth-third sub-grating unit GU63. The seventh grating unit GU7 includes a seventh-first sub-grating unit GU71, a seventh-second sub-grating unit GU72, and a seventh-third sub-grating unit GU73. The eighth grating unit GU8 includes an eighth-first sub-grating unit GU81, an eighth-second sub-grating unit GU82, and an eighth-third sub-grating unit GU83. The ninth grating unit GU9 includes a ninth-first sub-grating unit GU91, a ninth-second sub-grating unit GU92, and a ninth-third sub-grating unit GU93. As described above, an $i^{th}$ grating unit GUi includes an $i^{th}$-first sub-grating unit GUi1, an $i^{th}$-second sub-grating unit GUi2, and an $i^{th}$-third sub-grating unit GUi3.

An $i^{th}$-$j^{th}$ sub-grating unit GUij (i=1, . . . , 9, j=1, 2, 3) may indicate the smallest unit of a grating pattern set, and is provided to face any one of the first to third color filters CF1 to CF3 of the color filter array 370.

A sub-grating unit may include a grating pattern dependent on a wavelength band of light. For example, the $i^{th}$-first sub-grating unit GUi1 may include a grating pattern for diffracting first-wavelength light (e.g., light of a red wavelength band). The $i^{th}$-second sub-grating unit GUi2 may include a grating pattern for diffracting second-wavelength light (e.g., light of a blue wavelength band). The $i^{th}$-third sub-grating unit GUi3 may include a grating pattern for diffracting third-wavelength light (e.g., light of a green wavelength band). However, the $i^{th}$-first to $i^{th}$-third sub-grating units GUi1 to GUi3 are not limited thereto and may include grating patterns corresponding to light of various wavelength bands.

Although FIG. 5 illustrates that the first-first to ninth-third sub-grating units GU11 to GU93 included in the first to ninth grating units GU1 to GU9 have the same area (e.g., surface area size), the illustration merely corresponds to an example and is not provided for the purpose of limitation. The first-first to ninth-third sub-grating units GU11 to GU93 may have different areas, and an area ratio thereof may differ in the first to ninth grating units GU1 to GU9. Not all grating units may have different area ratios of sub-grating units, and some grating units may have the same area ratio of sub-grating units. The area ratios may be determined in consideration of the amount of light emitted from the light guide plate 120, or uniformity of light per location.

Referring to FIG. 6, the first-first to first-third sub-grating units GU11 to GU13 may include gratings G having different arrangement intervals and arrangement directions. The gratings G of the first-first sub-grating unit GU11 may have a pitch of $P_{11}$ and have an angle of $\varphi_{11}$ to indicate an arrangement direction thereof based on a certain reference line. The gratings G of the first-second sub-grating unit GU12 may have a pitch of $P_{12}$ and have an angle of $\varphi_{12}$ to indicate an arrangement direction thereof. The gratings G of the first-third sub-grating unit GU13 may have a pitch of $P_{13}$ and have an angle of $\varphi_{13}$ to indicate an arrangement direction thereof.

Although FIG. 6 illustrates that the first-first to first-third sub-grating units GU11 to GU13 have different arrangement directions and arrangement intervals, the illustration merely corresponds to an example and is not provided for the purpose of limitation. At least one of the arrangement direction and the arrangement interval of the gratings G may differ among the first-first to first-third sub-grating units GU11 to GU13.

The diffractor 170 may enable interaction between the gratings G and light of a specific wavelength, and allow the light to be emitted with a specific direction based on a combination of a pitch of the gratings G, an arrangement direction of the gratings G, a refractive index of the gratings G, a duty cycle of the gratings G, a proceeding direction of the light, a relative angle between the light and the gratings G, etc.

The gratings G of the 27 sub-grating units GUij (i=1, ..., 9, j=1, 2, 3) included in the illustrated 9 sections may have a pitch $P_{ij}$ and an arrangement direction $\varphi_{ij}$. The pitch $P_{ij}$ and the arrangement direction $\varphi_{ij}$ are determined to implement different directivities for light of different wavelengths. For example, the first-first to first-third sub-grating units GU11 to GU13 are used for light proceeding toward the same viewing zone but having different wavelengths, and thus at least one of the pitches and the arrangement directions thereof may differ from each other.

Figure 7:
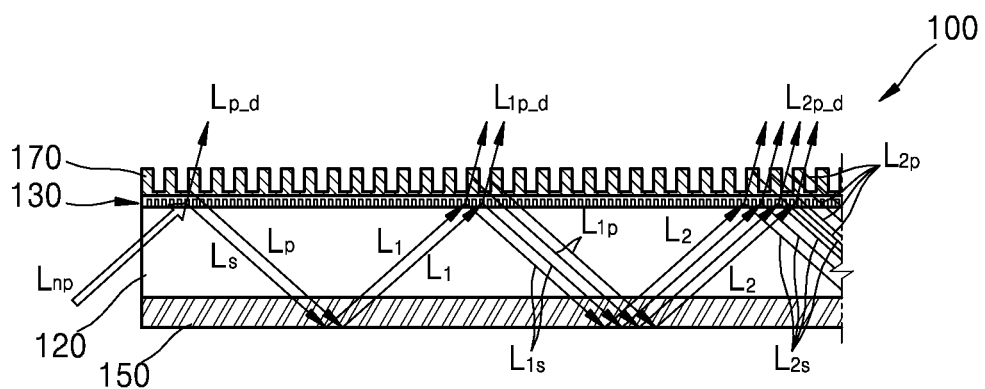
FIG. 7 is a conceptual view of optical paths for describing that the directional backlight unit included in the 3D image display apparatus of FIG. 1 provides directional light having a high optical efficiency.

FIG. 7 is a conceptual view of optical paths for describing that the directional backlight unit 100 included in the 3D image display apparatus 1000 of FIG. 1 provides directional light having a high optical efficiency.

Non-polarized light $L_{np}$ irradiated from the light source 110 proceeds in the light guide plate 120 and then is emitted through the reflective polarizer 130 and the diffractor 170. As illustrated in FIG. 7, when the non-polarized light $L_{np}$ is incident on the reflective polarizer 130, only first polarized light $L_p$ capable of being transmitted through the reflective polarizer 130 is transmitted through the reflective polarizer 130 and incident on the diffractor 170. A part of the first polarized light $L_p$ incident on the diffractor 170 may be emitted as directional light but another part thereof may be reflected toward the light guide plate 120. Along the above-described path, the first polarized light $L_p$ and second polarized light $L_s$ are incident on the polarization changing member 150 located on the bottom surface of the light guide plate 120. The polarization changing member 150 changes a polarization direction of incident light. A part of the first polarized light $L_p$ incident on the polarization changing member 150 is transformed into light of another polarization direction, and a part of the second polarized light $L_s$ is also transformed into light of another polarization direction. The light transformed by the polarization changing member 150 is indicated as $L_1$ and $L_2$, and the number of bounces thereof on the polarization changing member 150 is indicated as an index 1 or 2. $L_1$ indicated along two paths includes the light transformed from the part of the first polarized light $L_p$ incident on the polarization changing member 150, and the part of the second polarized light $L_s$, and thus has both a first polarization direction and a second polarization direction.

First polarized light $L_{1p}$ of the light $L_1$ is transmitted through the reflective polarizer 130, diffracted by the diffractor 170, and emitted as light $L_{1p\_d}$. A part of the light $L_{1p}$ transmitted through the reflective polarizer 130 is reflected by the diffractor 170 and enters the light guide plate 120. Second polarized light $L_{1s}$ of the light $L_1$ is reflected by the reflective polarizer 130 and enters the light guide plate 120. The light $L_{1s}$ and $L_{1p}$ returned into the light guide plate 120 as described above is incident on the polarization changing member 150 again and polarization-changed by the polarization changing member 150. Since parts of the light $L_{1s}$ and $L_{1p}$ are polarization-changed, light $L_2$ bounced on the polarization changing member 150 twice has both the first polarization direction and the second polarization direction. The light $L_2$ is incident on the reflective polarizer 130 again. First polarized light $L_{2p}$ of the light $L_2$ is transmitted through the reflective polarizer 130, diffracted by the diffractor 170, and emitted in the form of $L_{2p\_d}$. A part of the light $L_{2p}$ transmitted through the reflective polarizer 130 is reflected by the diffractor 170 and enters the light guide plate 120, and light $L_{2s}$ not transmitted through the reflective polarizer 130 also enters the light guide plate 120.

As the above-described operation is repeated, the second polarized light $L_s$ not transmitted through the reflective polarizer 130 enters the light guide plate 120 and is bounced on the polarization changing member 150 together with light transmitted through the reflective polarizer 130 and then reflected by the diffractor 170, and is incident on the reflective polarizer 130 again in the form of $L_1$, $L_2$, .... Although the above-described light has both the first polarization direction and the second polarization direction, since light not transmitted through the reflective polarizer 130 and the diffractor 170 are repeatedly polarization-changed, the amount of light transmitted through the reflective polarizer 130 is gradually increased.

As described above, the non-polarized light $L_{np}$ irradiated from the light source 110 is emitted in the form of $L_{p\_d}$, $L_{1p\_d}$, $L_{2p\_d}$, ..., i.e., polarized directional light.

Figure 8:
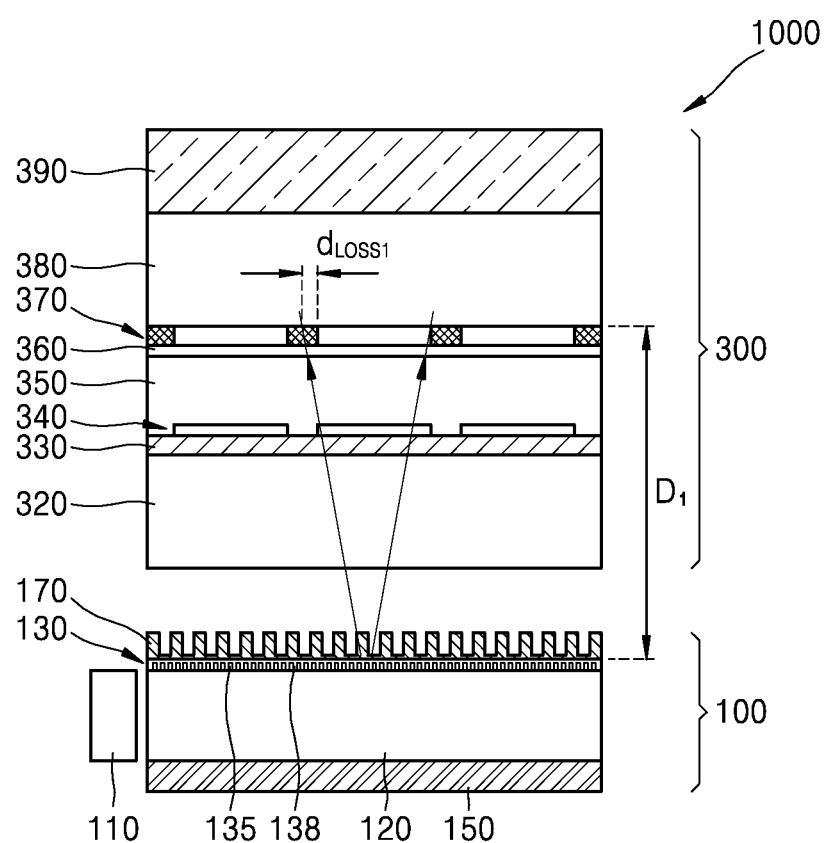
FIG. 8 is a conceptual view for describing that the 3D image display apparatus of FIG. 1 has low crosstalk due to the minimum distance between the diffractor and a pixel.

FIG. 8 is a conceptual view for describing that the 3D image display apparatus 1000 of FIG. 1 has low crosstalk due to the minimum distance between the diffractor 170 and a pixel.

As described above, the 3D image display apparatus 1000 according to an exemplary embodiment includes no polarizing plate on a bottom surface of the display panel 300. Accordingly, a distance $D_1$ between the diffractor 170 and the color filter array 370 is minimized. When the polarizing plate 390 located on a top surface of the display panel 300 is an absorption-type polarizing plate made of PVA, the thickness thereof is about 150 to 200 microns. If directional light generated by the diffractor 170 exceeds a determined pixel location, crosstalk is generated. As described above, the smallest grating unit provided on the diffractor 170 corresponds to a pixel, and incident light is modulated to correspond to directivity of the incident light in a region of the liquid crystal layer 350 corresponding to the pixel. However, due to the thickness of the display panel 300, when the directional light generated by the diffractor 170 reaches the pixel, the light may have an extended width and thus exceed a pixel width. The amount of crosstalk may be estimated based on how much the light exceeds the pixel width. The size of crosstalk may be expressed as, for example, a length $d_{Loss1}$ by which the directional light exceeds the pixel width. As illustrated in FIG. 8, $d_{Loss1}$ is increased if the distance $D_1$ between the diffractor 170 and the pixel is increased. Since the 3D image display apparatus 1000 according to an exemplary embodiment provides the polarizing plate 390 on the display panel 300 but does not provide a polarizing plate under the display panel 300, the distance $D_1$ is reduced by the thickness of the polarizing plate, and a distance indicating crosstalk, i.e., $d_{Loss1}$, is effectively reduced.

Figure 9:
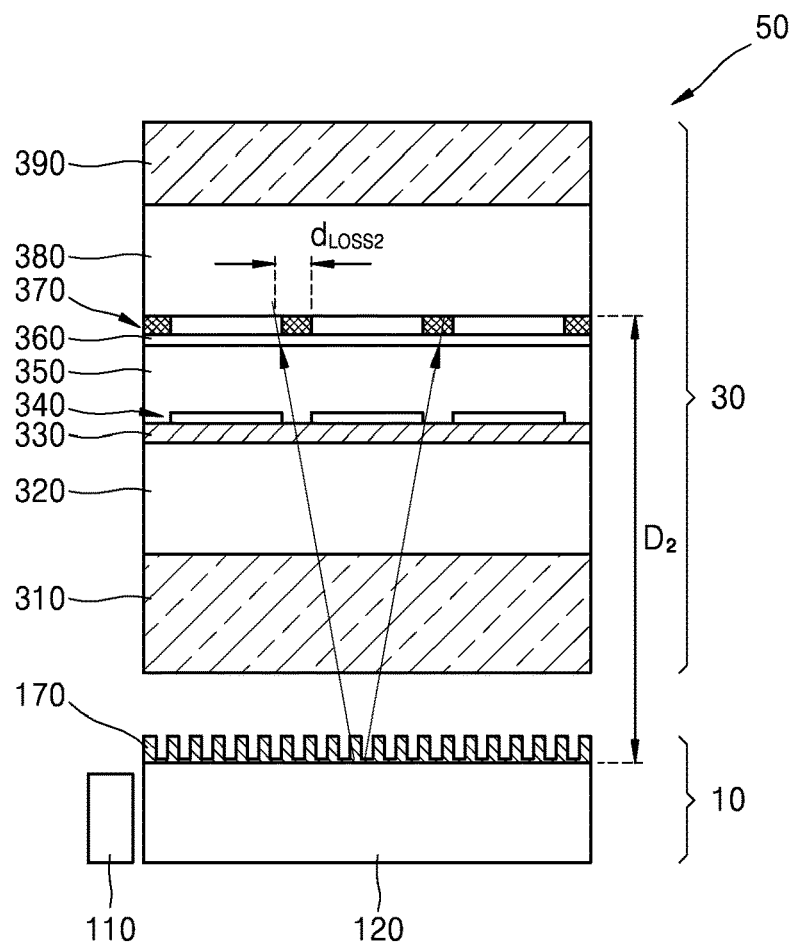
FIG. 9 is a cross-sectional view showing a structure of a 3D image display apparatus according to a comparative example.

FIG. 9 is a cross-sectional view showing a structure of a 3D image display apparatus 50 according to a comparative example.

The 3D image display apparatus 50 according to a comparative example includes a directional backlight unit 10 and a display panel 30. Unlike the directional backlight unit 100 according to an exemplary embodiment, the directional backlight unit 10 provides non-polarized directional light. Accordingly, in the display panel 30, polarizing plates 310 and 390 are provided under the first substrate 320 and above the second substrate 380, respectively. A polarizing plate made of PVA typically used for a liquid crystal panel has a thickness of about 150 to 200 microns, and thus a distance $D_2$ from the diffractor 170 to a pixel is increased by the thickness of the polarizing plate 310 compared to $D_1$ of FIG. 8. Since $D_2$ is increased, a width causing crosstalk, i.e., $d_{Loss2}$, is increased compared to $d_{Loss1}$.

Figure 10:
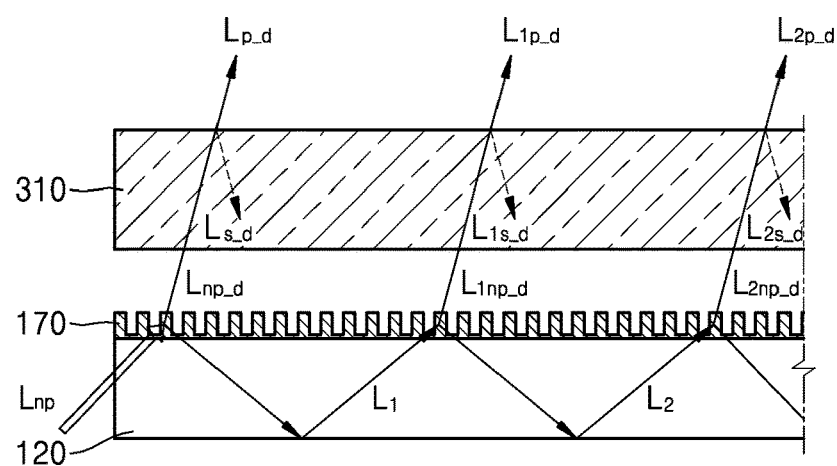
FIG. 10 is a conceptual view of optical paths for describing that the 3D image display apparatus of FIG. 9 has a lower optical efficiency compared to the 3D image display apparatus according to an exemplary embodiment.

FIG. 10 is a conceptual view of optical paths for describing that the 3D image display apparatus 50 of FIG. 9 according to a comparative example has a lower optical efficiency compared to the 3D image display apparatus 1000 according to an exemplary embodiment.

FIG. 10 illustrates only a part of the 3D image display apparatus 50 of FIG. 9, e.g., the light guide plate 120, the diffractor 170, and the polarizing plate 310, and shows optical paths of light $L_{np}$ irradiated from the light source 110 and provided to the liquid crystal layer 350 of the display panel 300.

The non-polarized light $L_{np}$ irradiated from the light source 110 is diffracted by the diffractor 170 and emitted as light $L_{np\_d}$. In this case, the non-polarized state is constantly maintained. A part of the light $L_{np}$ reflected by the diffractor 170 is bounced on a bottom surface of the light guide plate 120 due to total reflection, and then incident on the diffractor 170 again as light $L_1$. The incident light $L_1$ is emitted from the diffractor 170 as light $L_{1np\_d}$, and a part of the light $L_1$ is totally reflected on the bottom surface of the light guide plate 120 again and incident on the diffractor 170 as light $L_2$. The light $L_2$ incident on the diffractor 170 is emitted as light $L_{2np\_d}$. The above-described operation is repeated, and the directional light $L_{np\_d}$, $L_{1np\_d}$, and $L_{2np\_d}$ emitted from the directional backlight unit 10 is incident on the polarizing plate 310 under the display panel 300 in the non-polarized state. The polarizing plate 310 transmits light of a polarization direction and absorbs light of another polarization direction. Accordingly, for example, P-polarized light $L_{p\_d}$, $L_{1p\_d}$, and $L_{2p\_d}$ of the incident light $L_{np\_d}$, $L_{1np\_d}$, and $L_{2np\_d}$ is emitted, and S-polarized light $L_{s\_d}$, $L_{1s\_d}$, and $L_{2s\_d}$ thereof is absorbed by the polarizing plate 310. The absorbed light may not be incident on the liquid crystal layer 350, may not be used to form an image, and thus, may cause light loss.

On the contrary, in the 3D image display apparatus 1000 according to an exemplary embodiment, when the directional backlight unit 100 provides the polarized directional light 180, light components not transmitted through the reflective polarizer 130 are recycled and thus a high optical efficiency is achieved.

Figure 11:
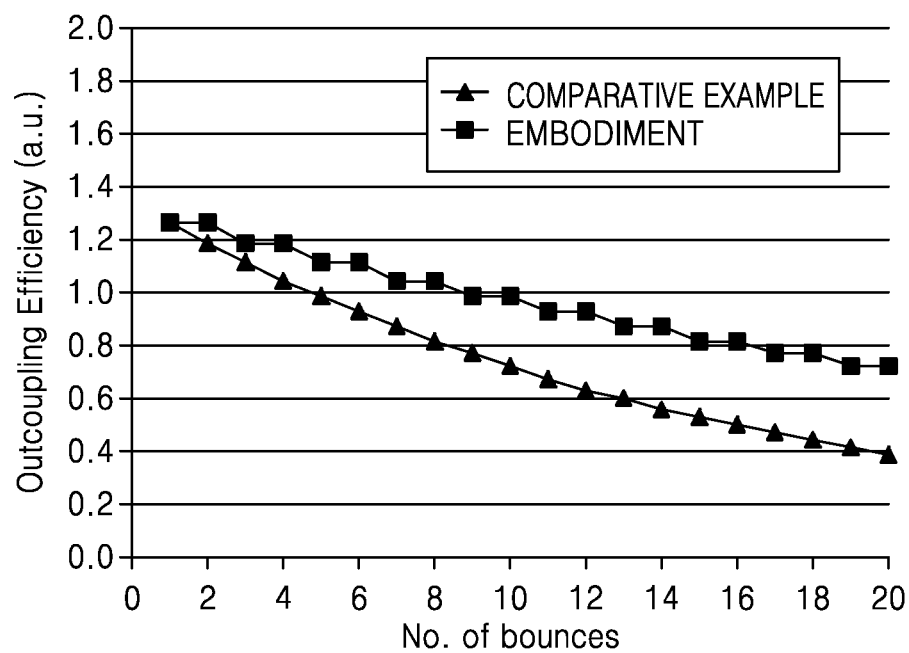
FIG. 11 is a graph for comparing optical efficiencies of the 3D image display apparatus according to an exemplary embodiment and the 3D image display apparatus according to a comparative example.

FIG. 11 is a graph for comparing optical efficiencies of the 3D image display apparatus 1000 according to an exemplary embodiment and the 3D image display apparatus 50 according to a comparative example.

A horizontal axis of the graph indicates the number of bounces, and a vertical axis thereof indicates outcoupling efficiency. The comparative example shows the optical efficiency of light achievable from the directional backlight unit 10 through the lower polarizing plate 310 to the liquid crystal layer 350 along the optical paths illustrated in FIG. 10. The exemplary embodiment shows the optical efficiency of light achievable from the directional backlight unit 100 to the liquid crystal layer 350 along the optical paths illustrated in FIG. 7.

As shown in the graph, in every number of bounces, the optical efficiency according to the exemplary embodiment is higher than the optical efficiency according to the comparative example.

Figure 12:
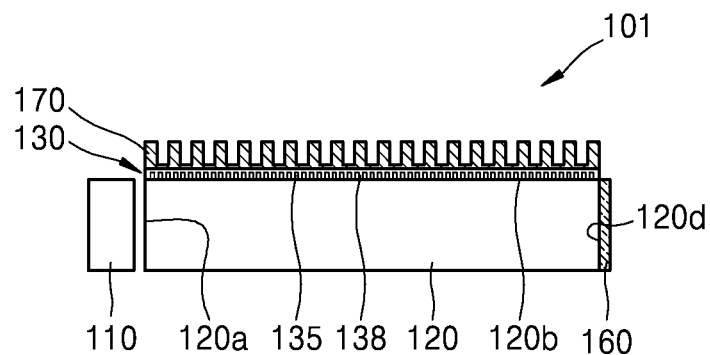
FIG. 12 is a cross-sectional view showing a structure of a directional backlight unit according to another exemplary embodiment.

FIG. 12 is a cross-sectional view showing a structure of a directional backlight unit 101 according to another exemplary embodiment.

The directional backlight unit 101 includes the light source 110, the light guide plate 120, the reflective polarizer 130, and the diffractor 170. In the current exemplary embodiment, a polarization changing member 160 is provided on a side surface $120d$ facing the incident surface $120a$. The polarization changing member 160 may be an element including, for example, a quarter-wave plate and a reflective plate. Light radiated from the light source 110 proceeds in the light guide plate 120 due to total reflection, and first polarized light thereof is transmitted through the reflective polarizer 130 and then emitted as directional light by the diffractor 170. Light not transmitted through the reflective polarizer 130 and proceeding in the light guide plate 120 may be polarization-changed by the polarization changing member 160 provided on the side surface $120d$, and then transmitted through the reflective polarizer 130 and emitted from the diffractor 170.

FIGS. 13A, 13B, 13C, 13D, 13E, and 13F are cross-sectional views for describing a method of manufacturing a directional backlight unit, according to an exemplary embodiment.

Figure 13A:
FIGS. 13A, 13B, 13C, 13D, 13E, and 13F are cross-sectional views for describing a method of manufacturing a directional backlight unit, according to an exemplary embodiment.

As illustrated in FIG. 13A, a light guide plate 420 is prepared. The light guide plate 420 may be made of glass or transparent plastic.

Figure 13B:
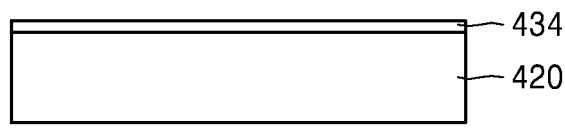

As illustrated in FIG. 13B, a metal layer 434 is formed on the light guide plate 420. The metal layer 434 may be made of a reflective metal such as Al, Ag, Mg, Pt, Pd, Au, Ni, Nd, Ir, or Cr, and may be formed using vapor deposition or the like.

Figure 13C:
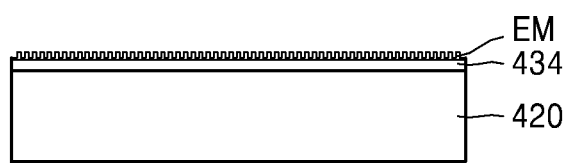

Then, as illustrated in FIG. 13C, an etching mask EM is provided on the metal layer 434. The etching mask EM may be generated using imprinting. Specifically, the etching mask EM illustrated in FIG. 13C may be generated by providing a material layer to be used as the etching mask EM, on the metal layer 434, and then imprinting a stamp having a shape to be patterned by etching the metal layer 434, on the material layer.

Figure 13D:
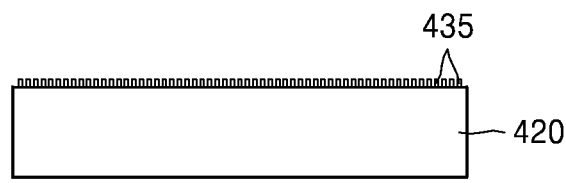

Subsequently, the metal layer 434 is etched using the etching mask EM, and then the remaining etching mask EM is removed. Thus, a reflective polarizer 430 having metal wires 435 arranged thereon is produced as illustrated in FIG. 13D.

Figure 13E:

Thereafter, as illustrated in FIG. 13E, a planarization layer 438 may be further generated to cover the metal wires 435. The planarization layer 438 may be made of a material having the same refractive index as that of the light guide plate 420, or made of the same material as that of the light guide plate 420.

Figure 13F:

Then, as illustrated in FIG. 13F, a diffractor 470 is formed on the reflective polarizer 430. The diffractor 470 may include a plurality of grating units including a plurality of gratings having the same or different shapes, arrangement directions, arrangement intervals, or the like. The diffractor 470 may be formed by, for example, coating a material layer to be formed as the diffractor 470, and imprinting a stamp having a desired pattern on the material layer.

The above-described directional backlight unit according to exemplary embodiments provides directional light generated using polarized light.

The above-described directional backlight unit according to exemplary embodiments has a high optical efficiency for providing directional light.

The above-described 3D image display apparatus including the directional backlight unit according to exemplary embodiments reduces the distance from a diffractor included in the directional backlight unit to a display pixel, and thus reduces crosstalk.

The above-described 3D image display apparatus according to exemplary embodiments has a high optical efficiency and is capable of providing a high-quality 3D image.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. A directional backlight unit comprising:
a light source configured to emit light;
a light guide plate comprising:
an incident surface on which light emitted by the light source is incident,
an emission surface from which the light incident on the incident surface is emitted, and
a reflective surface facing the emission surface;
a reflective polarizer provided on the emission surface and configured to transmit a portion of the light as first polarized light having a first polarization direction and reflect another portion of the light as second polarized light having a second polarization direction and being perpendicular to the first polarized light; and
a diffractor configured to diffract the first polarized light transmitted through the reflective polarizer toward a plurality of viewing zones,
wherein the diffractor comprises a plurality of diffractor units, each of the plurality of diffractor units comprising a plurality of sections respectively corresponding to the plurality of viewing zones, such that a number of the plurality of sections and a number of the plurality of viewing zones is the same,
wherein each of the plurality of sections comprises a grating unit configured to control an emission direction of light, and
wherein each of the plurality of grating units comprises a plurality of sub-grating units.

2. The directional backlight unit of claim 1, wherein the reflective polarizer is a wire grid polarizer which comprises a plurality of metal wires arranged repeatedly along the first polarization direction, and
wherein the plurality of metal wires are made of a reflective metal and have a length direction parallel to the second polarization direction.

3. The directional backlight unit of claim 2, wherein the plurality of metal wires are integrally provided on the emission surface of the light guide plate.

4. The directional backlight unit of claim 3, further comprising a planarization layer provided to cover spaces between and on the plurality of metal wires.

5. The directional backlight unit of claim 4, wherein the planarization layer is made of a material having a refractive index that is the same as a refractive index of the light guide plate.

6. The directional backlight unit of claim 2, wherein the wire grid polarizer further comprises a transparent substrate on which the plurality of metal wires are arranged.

7. The directional backlight unit of claim 6, wherein the transparent substrate is made of a material having a refractive index that is the same as a refractive index of the light guide plate.

8. The directional backlight unit of claim 1, further comprising a polarization changing member provided on the reflective surface.

9. The directional backlight unit of claim 1, further comprising a polarization changing member provided on a surface of the light guide plate facing the incident surface.

10. The directional backlight unit of claim 1, wherein each of the sub-grating units comprises gratings, and
wherein an arrangement direction or an arrangement interval of the gratings comprised in one of the plurality of sub-grating units differs from an arrangement direction or an arrangement interval of the gratings comprised in another of the plurality of sub-grating units.

11. A method of manufacturing a directional backlight unit, the method comprising:
forming a wire grid polarizer on a light guide plate; and
forming a diffractor comprising a plurality of diffraction regions on the wire grid polarizer, wherein an arrangement interval or an arrangement direction of one of the plurality of diffraction regions differs from an arrangement interval or an arrangement direction of another of the plurality of diffraction regions.

12. The method of claim 11, wherein the forming the wire grid polarizer comprises:
   forming a reflective metal layer on the light guide plate; and
   forming a pattern of a plurality of metal wires by etching the reflective metal layer.

13. The method of claim 12, further comprising forming a planarization layer to cover spaces between and on the plurality of metal wires.

14. The method of claim 13, wherein the planarization layer is made of a material having a refractive index that is the same as a refractive index of the light guide plate.

15. A three-dimensional (3D) image display apparatus comprising:
   a directional backlight unit comprising:
     a light source configured to emit light;
     a light guide plate comprising:
       an incident surface on which light emitted by the light source is incident,
       an emission surface from which the light incident on the incident surface is emitted, and
       a reflective surface facing the emission surface;
     a reflective polarizer provided on the emission surface and configured to transmit a portion of the light as first polarized light having a first polarization direction and reflect another portion of the light as second polarized light having a second polarization direction and being perpendicular to the first polarized light; and
     a diffractor configured to diffract the first polarized light transmitted through the reflective polarizer toward a plurality of viewing zones; and
   a display panel provided to modulate the diffracted light radiated from the directional backlight unit, based on image information,
   wherein the diffractor comprises a plurality of diffractor units, each of the plurality of diffractor units comprising a plurality of sections respectively corresponding to the plurality of viewing zones, such that a number of the plurality of sections and a number of the plurality of viewing zones is the same,
   wherein each of the plurality of sections comprises a grating unit configured to control an emission direction of light, and
   wherein each of the plurality of grating units comprises a plurality of sub-grating units.

16. The 3D image display apparatus of claim 15, wherein the display panel is a liquid crystal panel.

17. The 3D image display apparatus of claim 16, wherein the liquid crystal panel comprises only one polarizing plate.

18. The 3D image display apparatus of claim 17, wherein the liquid crystal panel comprises a display surface, and
   wherein the polarizing plate is located on the display surface of the liquid crystal panel.

19. The 3D image display apparatus of claim 18, wherein the polarizing plate is an absorption-type polarizing plate configured to transmit a portion of the light having one of a first polarization direction and a second polarization direction, and absorb another portion of the light having the other one of the first polarization direction and the second polarization direction.

* * * * *